United States Patent
Metz et al.

(10) Patent No.: US 10,069,154 B2
(45) Date of Patent: Sep. 4, 2018

(54) AIR FEED DEVICE FOR A FUEL CELL

(75) Inventors: Dietmar Metz, Meckenheim (DE); Martin Mueller, Speyer (DE); Aleksandar Sekularac, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 655 days.

(21) Appl. No.: 14/237,375

(22) PCT Filed: Aug. 17, 2012

(86) PCT No.: PCT/US2012/051352
§ 371 (c)(1),
(2), (4) Date: Feb. 6, 2014

(87) PCT Pub. No.: WO2013/028521
PCT Pub. Date: Feb. 28, 2013

(65) Prior Publication Data
US 2014/0186745 A1 Jul. 3, 2014

(30) Foreign Application Priority Data

Aug. 24, 2011 (DE) .......................... 10 2011 111 576
Sep. 21, 2011 (DE) .......................... 10 2011 113 971

(51) Int. Cl.
*F04D 29/057* (2006.01)
*H01M 8/04082* (2016.01)
(Continued)

(52) U.S. Cl.
CPC .... *H01M 8/04201* (2013.01); *F04D 25/0606* (2013.01); *F04D 29/057* (2013.01); *H01M 8/04089* (2013.01)

(58) Field of Classification Search
CPC .............. F04D 29/057; F04D 25/0606; H01M 8/04201; H01M 8/04089; F02C 6/12; F05D 2220/40; Y02E 60/50
See application file for complete search history.

(56) References Cited

U.S. PATENT DOCUMENTS 3,017,230 A * 1/1962 Meermans .............. F01D 25/18
184/6.11
4,177,006 A * 12/1979 Nancarrow ........... F02B 37/025
415/151

(Continued)

FOREIGN PATENT DOCUMENTS

JP 2009257165 A * 11/2009 ........... F04D 29/051

*Primary Examiner* — Peter J Bertheaud
*Assistant Examiner* — Dnyanesh Kasture
(74) *Attorney, Agent, or Firm* — Eric L. Doyle; Stephen A. Pendorf; Patent Central LLC

(57) ABSTRACT

An air feed device (1) for a fuel cell, having a shaft (2); a compressor wheel (4) fastened to one of the ends (5, 20) of the shaft (2), a bearing arrangement (6, 7, 8) arranged in a bearing housing (9) for mounting the shaft (2), and an electric motor (10) for driving the shaft (2), which electric motor is arranged in the bearing housing (9). The shaft (2) has two shaft bearing portions (11, 12) and a magnet portion (13) arranged between the shaft bearing portions (11, 12), forming the rotor of the electric motor (10). The shaft bearing portions (11, 12) and the magnet portion (13) are centered relative to one another by means of a centering arrangement (12A, 13F) which engages on an outer edge (A), the shaft bearing portions (11, 12) and the magnet portion (13) bearing in each case axially against one another.

16 Claims, 3 Drawing Sheets

Figure 1A:
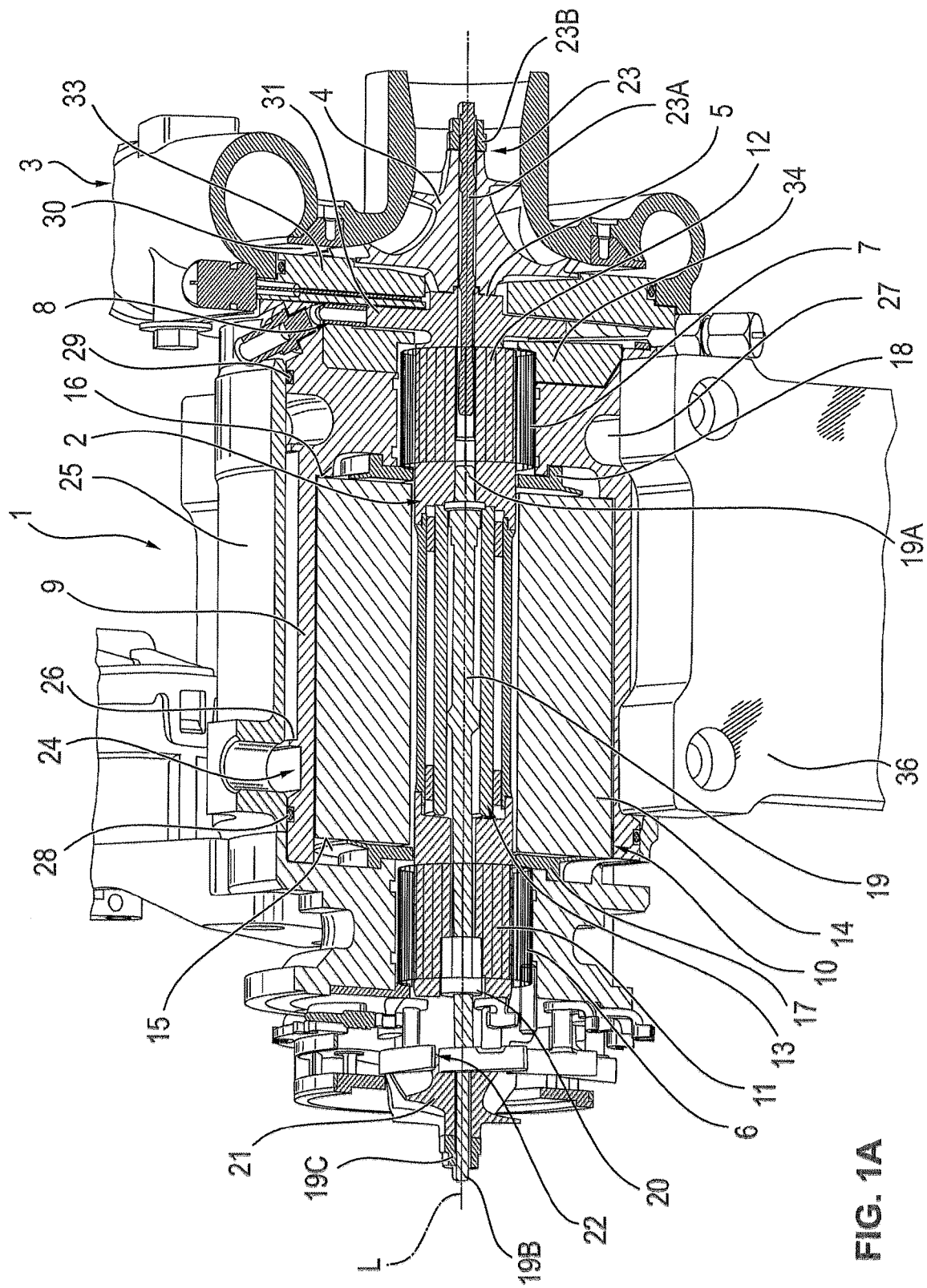

(51) Int. Cl.
*F04D 25/06* (2006.01)
*H01M 8/04089* (2016.01)

(56) References Cited

U.S. PATENT DOCUMENTS

| | | | | |
|---|---|---|---|---|
| 5,529,398 | A * | 6/1996 | Bosley | F01D 25/168 |
| | | | | 384/105 |
| 6,296,441 | B1 * | 10/2001 | Gozdawa | F04D 25/0606 |
| | | | | 415/180 |
| 8,376,722 | B2 * | 2/2013 | Takado | F04D 29/051 |
| | | | | 415/107 |
| 2004/0005228 | A1 * | 1/2004 | Agrawal | F04D 25/06 |
| | | | | 417/365 |
| 2005/0042105 | A1 * | 2/2005 | Nishiyama | F04D 29/266 |
| | | | | 416/183 |
| 2005/0123417 | A1 * | 6/2005 | DelVecchio | F01D 5/025 |
| | | | | 417/407 |
| 2005/0207885 | A1 * | 9/2005 | Daudel | F01D 17/165 |
| | | | | 415/191 |
| 2006/0279148 | A1 * | 12/2006 | Baumgartner | H02K 5/1732 |
| | | | | 310/90 |
| 2008/0080966 | A1 * | 4/2008 | Ueno | F01D 25/16 |
| | | | | 415/112 |
| 2009/0274548 | A1 * | 11/2009 | Joco | F01D 11/02 |
| | | | | 415/112 |
| 2011/0097222 | A1 * | 4/2011 | Komatsu | F04D 25/0606 |
| | | | | 417/366 |
| 2011/0243762 | A1 * | 10/2011 | Daikoku | F04D 25/0606 |
| | | | | 417/321 |

\* cited by examiner

AIR FEED DEVICE FOR A FUEL CELL

The invention relates to an air feed device for a fuel cell as per the preamble of claim 1.

For efficient operation of a fuel cell, it is necessary for the latter to always be supplied with an adequate amount of air. For this purpose, a commercially available air feed device, which falls within the prior art, as per the preamble of claim 1 is known which realizes the feed of air by means of a compressor wheel which is arranged in a compressor housing and which is driven by an electric motor.

Owing to the structural design of the known air feed device, however, the latter has the disadvantage that the electric motor can drive the compressor wheel at maximum rotational speeds of approximately 100,000 rpm. Here, tests carried out within the context of the invention have shown that such rotational speeds cannot fully exploit the potential of modern compressor wheels and compressor housings, such that at least in some usage situations, an adequate supply of air to the fuel cell is not ensured, or is at least not ensured to the full extent, by means of the known device.

It is therefore an object of the present invention to provide an air feed device of the type specified in the preamble of claim 1 which makes it possible to realize a high efficiency and thus the supply of a large quantity of air to the fuel cell. Furthermore, the air feed device should be realized in as compact a form as possible.

Said object is achieved by means of the features of claim 1.

By virtue of the fact that the shaft of the air feed device according to the invention is divided into three portions which are formed by two shaft bearing portions and by a magnet portion which forms the rotor of the electric motor, which portions are braced against one another in the fully assembled state, it is possible to realize a shaft construction which is stiffer in relation to the prior art, which, in particular in conjunction with an air bearing arrangement, permits rotational speeds of the compressor wheel of up to 150,000 rpm. In this way, it is possible for the air feed device according to the invention to supply to the fuel cell air mass flows which are considerably higher again in relation to the prior art, wherein the construction of the air feed device according to the invention is more compact and material-saving.

The subclaims relate to advantageous refinements of the invention.

Those preferred measures which permit further increases in performance of the air feed device according to the invention and which are to be given particular emphasis include the construction of the air bearing arrangement with preferably two radial air bearings on both sides of the electric motor and an axial air bearing which is arranged adjacent to the compressor wheel.

It is also possible for the waste air and/or waste heat also generated by fuel cells to be utilized through the additional provision of a turbine wheel on the shaft of the air feed device, which turbine wheel is arranged in a turbine housing which is preferably provided with a variable turbine geometry (VTG) in order to further increase the efficiency of the turbine.

Here the components compressor wheel, compressor housing, turbine wheel and turbine housing may be dimensioned and constructed as in conventional exhaust-gas turbochargers, which in turn reduces the construction outlay of the air feed device according to the invention.

The further preferred features to be given emphasis include a cooling device which, in a particularly preferred embodiment, is formed by the outer side of the bearing housing and by an outer casing surrounding said outer side, these delimiting a coolant interior which is preferably provided with flow-guiding elements and into which coolant, preferably cooling water, can be introduced.

To be able to realize particularly effective cooling in particular of the axial bearing, it is possible here to provide a separate axial bearing cooling portion which may be formed for example as a recessed coolant ring which is formed in the bearing housing and which is arranged adjacent to the axial bearing.

Figure 1B:
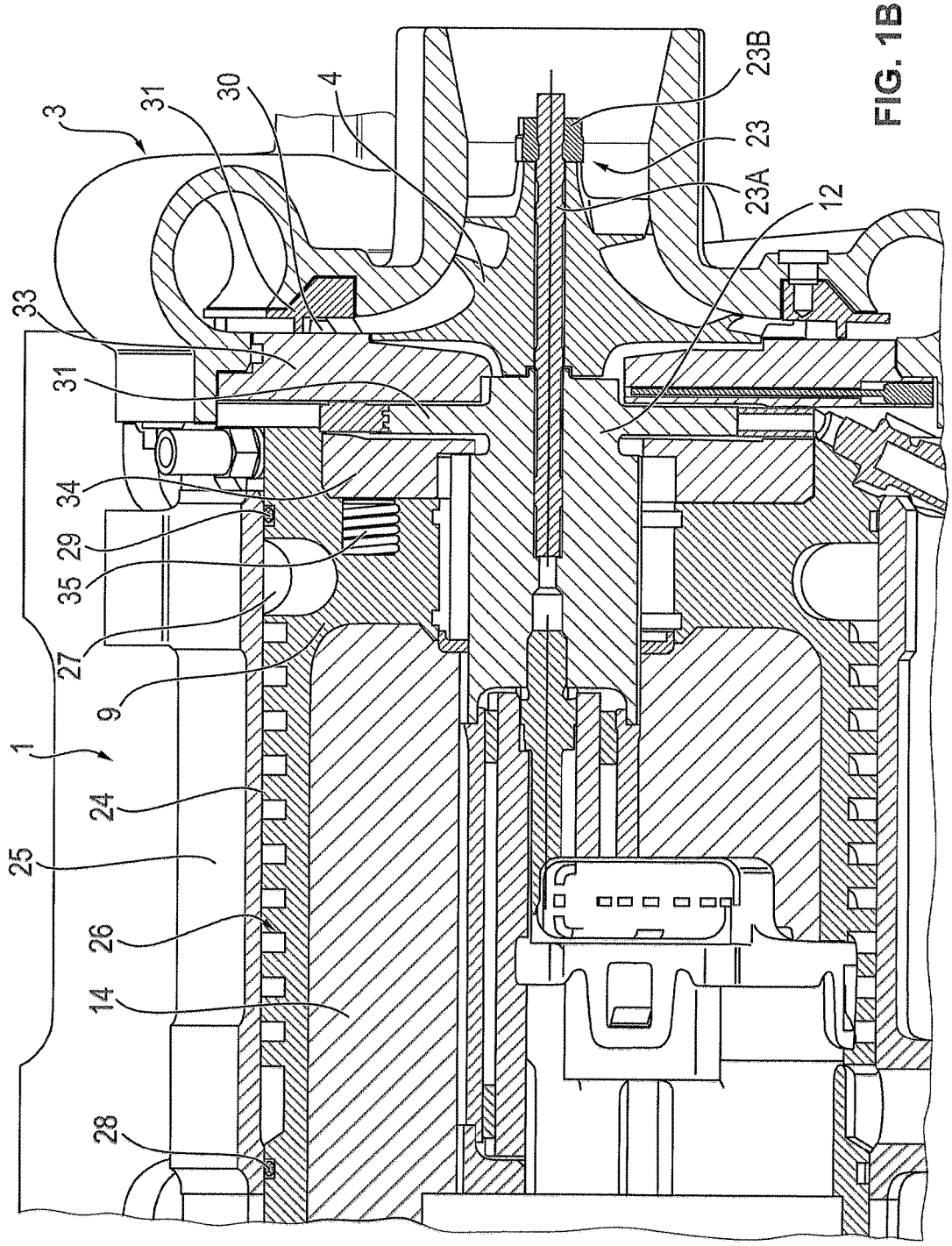
Figure 2:
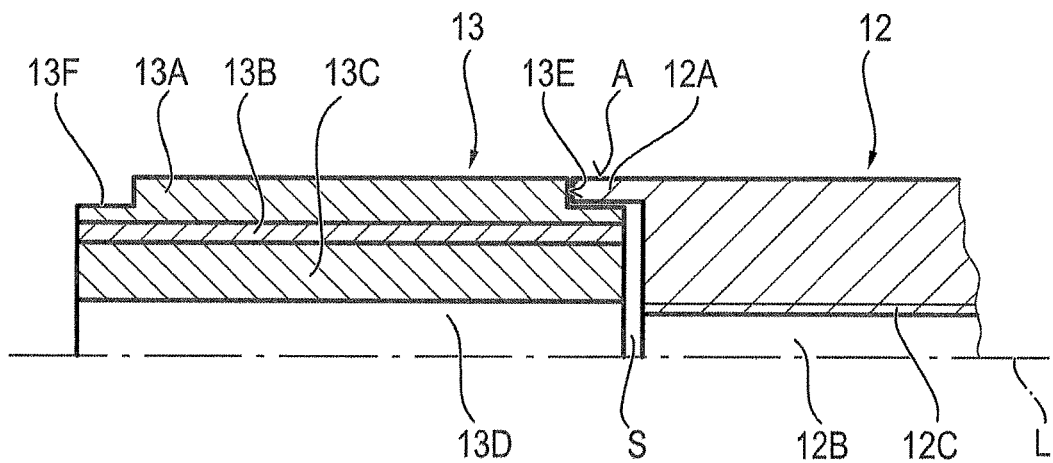
Figure 3:
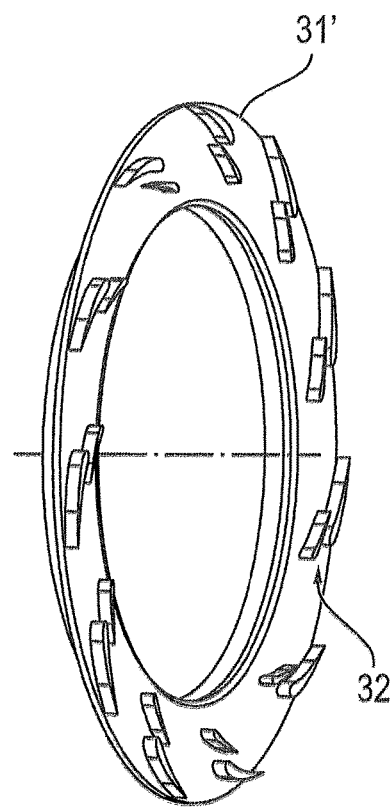

Further details, features and advantages of the invention will emerge from the following description of exemplary embodiments on the basis of the drawing, in which:

FIGS. 1A, 1B show schematically slightly simplified longitudinal sectional illustrations through an air feed device according to the invention which is suitable for fuel cells but also for other appliances and devices which must be supplied in particular with large amounts of air, FIG. 2 shows a detail illustration of a part of the shaft of the air feed device in a longitudinal section, and FIG. 3 shows a perspective illustration of a blade ring for a diffuser of a compressor housing of the air feed device according to the invention.

FIG. 1A shows a preferred embodiment of an air feed device 1 according to the invention, by means of which for example a fuel cell (not illustrated in detail in FIG. 1A) can be supplied with the air mass flow required for its efficient operation.

The air feed device 1 has a shaft 2 which extends along a longitudinal axis L of the air feed device 1.

To one end 5 of the shaft 2 there is fastened a compressor wheel 4 which is arranged in a compressor housing 3. Here, the compressor housing 3 and the compressor wheel 4 may be of corresponding design to a compressor of an exhaust-gas turbocharger. In the illustrated example, for fastening, a screw connection 23 is provided which has a threaded pin 23A which extends through the compressor wheel and which is screwed with one end into an internal thread of a shaft bearing portion 12 and onto the outer end of which is screwed a nut 23B by means of which the compressor wheel 4 is fastened to the shaft 2.

Furthermore, the air feed device 1 has a bearing arrangement which, in the example, is in the form of an air bearing arrangement with two radial air bearings 6 and 7 and an axial air bearing 8. The radial air bearings 6 and 7 are arranged on associated shaft bearing portions 11 and the abovementioned shaft bearing portion 12. Between the shaft bearing portions 11 and 12 there is provided a magnet portion 13 which forms the rotor of an electric motor 10, said electric motor also including a coil 14 which forms the stator of the electric motor 10 and which, for this purpose, surrounds the magnet portion 13 and is guided in a bearing housing 9. Furthermore, guide elements 17 and 18 are provided which may be formed for example as Teflon disks which bear against the respective end sides 15 and 16 of the coil 14 and which hold the air bearings 6, 7. Furthermore, said guide elements 17 and 18 perform a sealing function with respect to the shaft 2 in order to prevent an outflow of air. Said guide elements 17 and 18 finally serve as emergency running bearings.

Instead of the above-described air bearing arrangement, other bearings arrangements such as in particular magnet bearing arrangements are also basically conceivable.

As shown in FIG. 1A, owing to the provision of the shaft bearing portions 11 and 12 and of the magnet portion 13, the shaft 2 is divided into three shaft portions which are formed by the abovementioned shaft bearing portions 11, 12 and the magnet portion 13.

Said three portions 11 to 13 are braced against one another in the fully assembled state, for which purpose, in the example, a tie rod 19 is provided. Here, the portions 11 to 13 are preassembled on the tie rod 19 outside the bearing housing, for which purpose said tie rod is screwed with its free end portion 19A into an internal thread of the shaft bearing portion 12, if appropriate with the interposition of a washer. At the left-hand end of the shaft bearing portion 11, the arrangement composed of the three portions 11 to 13 is fixed to the tie rod 19 by means of a shaft nut 20. In said preassembled state, said arrangement can undergo further machining, for example can preferably be ground and coated.

The compressor wheel 4 is subsequently fixed with a first axial bearing half 33 to the shaft bearing portion 12, and said arrangement is balanced. The second axial bearing half 34 is subsequently plugged onto the arrangement which is formed, and the radial bearings 6 and 7 are fixed in the bearing housing. The preassembled shaft assembly described above can then be inserted as a whole into the bearing housing 9.

In the particularly preferred embodiment illustrated in FIG. 1A, a turbine wheel 21 is arranged on that end region of the shaft 2 which is situated opposite the end 5 of the shaft 2, which turbine wheel is provided with a variable turbine geometry 22 in order to increase efficiency. The turbine housing which is self-evidently provided is not illustrated in FIG. 1 in order to provide a better illustration of the VTG 22, but is self-evidently likewise provided in addition to the compressor housing 3 in the operationally ready air feed device 1.

For the final bracing of said unit, after the turbine wheel 21 has been mounted onto the other free end 19B of the tie rod 19, a nut 19C is screwed onto said tie rod such that the entire shaft assembly composed of the shaft bearing portions 11 and 12 and the magnet portion 13 and the optionally provided turbine wheel 21 is braced.

In the embodiment illustrated in FIG. 1A, the compressor wheel 4 is fixed to the shaft 2 by means of the screw connection 23, as already described above. It is however also possible for the compressor wheel 4 to be connected to the shaft assembly of the shaft 2 in the above-described way via the tie rod 19, and in this case for the turbine wheel 21 to be correspondingly connected via the screw connection 23.

FIG. 1A also shows that the particularly preferred embodiment of the air feed device 1 illustrated in said figure also has an axial air bearing 8 which is arranged in the bearing housing 9 adjacent to the compressor wheel 4 and which interacts with a radially outwardly projecting shaft collar 31, to both sides of which the axial bearing halves are arranged.

Finally, FIG. 1A shows that the preferred embodiment of the air feed device 1 also has a cooling device 24 which is delimited between the outer side of the bearing housing 9 and an outer casing 25 which surrounds the bearing housing 9 at the outside with a spacing. In this way, it is possible for a cooling jacket to be formed, into which coolant, preferably in the form of cooling water, can be introduced in order to be able to provide the components of the air feed device 1 with the required cooling.

In particular for the cooling of the axial air bearing 8, the coolant device 24 in the particularly preferred embodiment illustrated in FIG. 1A has an axial cooling bearing portion 27 which is formed by an annular duct formed into the bearing housing 9, said annular duct being provided adjacent to the axial air bearing 8 in order to be able to impart an increased cooling action there.

It must finally be mentioned that the outer casing 25 is sealed off and supported in a flexible manner with respect to the bearing housing 9 by means of an O-ring arrangement 28 and 29 provided in each case in the end portions of the outer casing 25. Here, a static fixing device 36, for example in the form of a bearing block for the installation of the air feed device 1 in a motor vehicle, engages on the outer casing 25 such that the above-described O-rings 28 and 29 can perform not only their sealing function but also a damping function.

FIG. 1B, which illustrates a further longitudinal section, albeit in a different location, through the air feed device 1, also clearly shows that a spring pack arrangement is provided in the bearing housing 9 in the particularly preferred embodiment, of which spring pack arrangement one spring pack 35 is visible owing to the selected section position in FIG. 1B. The spring pack arrangement however conventionally has at least two such spring packs 35. After the above-described insertion of the shaft assembly with the two axial bearing halves 33 and 34, the spring pack arrangement presses the axial bearing halves 34 onto the annular disk or the shaft collar 31, which constitutes a further simplification of the assembly process.

The illustration of FIG. 1B also shows, in enlarged form, the cooling device 24 already described on the basis of FIG. 1A with its flow-guiding elements, said cooling device being formed, in the example, as a spiral duct arrangement which generates a preferably spiral-shaped coolant flow for increasing the cooling action.

With regard to the increase, explained in the introduction, of the efficiency of the air feed device 1 according to the invention, it is also provided as a further distinguishing feature that the shaft bearing portions 11 and 12 and the magnet portion 13 are centered relative to one another at an outer edge of the arrangement, as can be seen from the detail illustration of FIG. 2.

In this regard, FIG. 2 shows the magnet portion 13 which has an outer annular reinforcement 13A, a sleeve 13B which bears against the inner circumferential ring of said reinforcement, and a magnet 13C which in turn bears against the inner circumference of the sleeve 13B, said magnet being provided with a central longitudinal through-recess 13D through which the tie rod 19 can be guided. To provide a simpler illustration and explanation, FIG. 2 shows only that region of the detail of FIG. 1 which is arranged above the longitudinal axis L. The tie rod 19 shown in FIG. 1 is not otherwise illustrated in FIG. 2. It is also possible for the reinforcement 13A to be attached directly to the magnet 13C, that is to say without the sleeve 13B.

The abovementioned outer centering on the outer edge A is realized by means of an axially projecting lug 12A which engages with its inner circumference into a correspondingly formed annularly encircling step 13F of the reinforcement 13A and which has an axial stop surface 13E against which the lug 12A bears axially. To avoid a double fit, play S is provided between the magnet portion 13 and the shaft bearing portion 12 illustrated in FIG. 2, said shaft bearing portion including the lug 12A and a longitudinal through-recess 12B in which is provided an internal thread 12C into which the first free end portion 19A, explained with regard to FIG. 1, of the tie rod 19 and the threaded rod 23A can be screwed.

The centering, oriented at the outer edge, between the components 12 and 13 yields increased stability of the shaft, wherein it must be emphasized that the above-explained stabilization is self-evidently realized in the same way between the shaft bearing portion 11 and the magnet portion 13, though this is not illustrated in detail in FIG. 2 for the sake of simplicity.

To allow the tie rod 19 to pass through, the shaft bearing portion 11 self-evidently also has a longitudinal central bore extending through its entire length, corresponding to the passage recess 13D and 12B.

In a further alternative of the arrangement as per FIG. 2, it is possible for the central part 13B to be a magnet and for part 13C to constitute an inner shaft, such that in said arrangement, the magnet 13B is encapsulated between the outer reinforcement 13A and the inner shaft 13C, which is advantageous in particular if the magnet has a relatively porous structure which is stabilized as a result of the encasement by the reinforcement 13A and the shaft 13C.

For a further increase in efficiency, it is finally possible for the compressor housing 3 to have a diffuser 30 which is provided with a blading, the latter being illustrated in schematically slightly simplified form in FIG. 3 because said blading is not visible in FIG. 1 owing to the illustration depicted in said figure. The blading of the diffuser 30 may be realized, corresponding to the illustration of FIG. 3, by means of a ring 31' which can be inserted into the diffuser 30 and which is provided with a blade arrangement 32 that can be adapted according to the application, as can be seen by way of an example from the perspective illustration of FIG. 3. As FIG. 3 shows in particular, the blade arrangement 32 in the particularly preferred arrangement illustrated there is in the form of a double blading which, in the example, comprises eleven blade pairs. The number of blade pairs, the design thereof, the alignment thereof relative to one another and the alignment thereof relative to the ring 31 may however be modified according to the application.

In addition to the above written disclosure of the invention, reference is hereby also made explicitly to the diagrammatic illustration in FIGS. 1 to 3. Furthermore, any conceivable combinations of the above-described individual components of the invention are possible according to the invention, such that the invention is not restricted to the examples described above.

LIST OF REFERENCE SYMBOLS

1 Air feed device
2 Shaft
3 Compressor housing
4 Compressor wheel
5 First end of the shaft 2
6, 7, 8 Air bearing arrangement or radial air bearing 6, 7 and axial air bearing 8
9 Bearing housing
10 Electric motor
11, 12 Shaft bearing portions
12A Lug
12B Longitudinal central recess
12C Internal thread
13 Magnet portion
13A Sleeve-like reinforcement
13B Sleeve
13C Annular magnet
13D Longitudinal central recess of the magnet 13C
13E Axial stop surface of the reinforcement 13A
13F Step
14 Coil
15, 16 End sides of the coil
17, 18 Guide elements (Guide disks)
19 Tie rod
19A, 19B Free ends of the tie rod
19C Nut
20 Shaft nut
21 Turbine wheel
22 VTG
23 Screw connection
23A Threaded rod
23B Screw
24 Cooling device
25 Outer jacket
26 Flow-guiding elements of the guide device 24 for generating a preferably rotating, spiral-shaped coolant flow
27 Axial bearing cooling portion
28, 29 O rings
30 Diffuser
31 Annular disk/shaft collar
31' Ring
32 Blading
33, 34 Axial bearing halves
35 Spring pack
36 Static fixing device/bearing block
L Longitudinal axis
S Play
A Outer edge

The invention claimed is:

1. An air feed device (1) for a fuel cell, having
a shaft (2) having first and second ends (5, 20);
a compressor wheel (4) arranged in a compressor housing (3) and fastened to the first end (5) of the shaft (2),
a bearing arrangement (6, 7, 8) arranged in a bearing housing (9) for mounting the shaft (2), and
an electric motor (10) for driving the shaft (2), said electric motor arranged in the bearing housing (9),
wherein the shaft (2) is comprised of at at least
a first shaft bearing part (11),
a second shaft bearing part (12), and
a shaft magnet part (13) arranged between the first and second shaft bearing parts (11, 12), and forming a rotor of the electric motor (10), the shaft bearing parts (11, 12) and the shaft magnet part (13) being braced against one another,
wherein the shaft bearing parts (11, 12) and the shaft magnet part (13) are centered co-axially relative to one another by way of a circumferential centering arrangement (12A, 13F), each of the shaft bearing parts (11, 12) bearing axially against the shaft magnet part (13),
wherein the shaft bearing parts (11, 12) and the shaft magnet part (13) are braced against one another by way of a tie rod (19), and
wherein the compressor wheel (4) is connected to the shaft (2) by a screw connection (23) that is separate from the tie rod (19), said screw connection (23) comprising a threaded pin (23A) having an inner end and an outer end, said threaded pin (23A) extending through the compressor wheel (4), said inner end screwed into an internal thread of the shaft bearing portion (12) of the shaft (2), and a nut (23B), said nut (23B) screwed onto said outer end, said nut (23B) fastening the compressor wheel (4) to the shaft (2).

2. The air feed device as claimed in claim 1, wherein a coil (14) is provided which forms a stator of the electric motor (10) and which is arranged around the shaft magnet part (13) in the bearing housing (9).

3. The air feed device as claimed in claim 2, wherein the coil (14) has first and second axial ends (15, 16) and is guided by way of two axial guide elements (17, 18), which bear against the first and second axial ends (15, 16) of said coil, in the bearing housing (9).

4. The air feed device as claimed in claim 1, wherein the bearing arrangement is an air bearing arrangement with
a radial air bearing (6, 7) arranged on each side of the electric motor (10) on the shaft bearing part (11, 12), and
an axial air bearing (8).

5. The air feed device as claimed in claim 4, wherein the axial air bearing (8) is arranged adjacent to the compressor wheel (4) in the bearing housing (9).

6. The air feed device as claimed in claim 5, wherein the axial air bearing (8) has two axial bearing halves (33, 34) which are arranged one on either side of a shaft collar (31) and which are preloaded by way of a spring pack arrangement (35) arranged in the bearing housing (9).

7. The air feed device as claimed in claim 1, wherein a cooling device (24) is provided between the bearing housing (9) and an outer casing (25) which surrounds said bearing housing.

8. The air feed device as claimed in claim 7, wherein the cooling device (24) has flow-guiding elements (26).

9. The air feed device as claimed in claim 8, wherein the flow-guiding elements (26) are in the form of an arrangement of spiral ducts.

10. The air feed device as claimed in claim 8, wherein the bearing arrangement includes an axial bearing, and wherein the cooling device (24) has an axial bearing cooling portion (27) arranged in the bearing housing (9).

11. The air feed device as claimed in claim 8, wherein the outer casing (25) is supported on the bearing housing (9) via O-rings (28, 29).

12. The air feed device as claimed in claim 1, wherein the compressor housing (3) has a bladed diffuser (30).

13. The air feed device as claimed in claim 12, wherein the diffuser (30) is provided with a double blading (32).

14. An air feed device (1) for a fuel cell, having
a shaft (2) having first and second ends (5, 20);
a compressor wheel (4) arranged in a compressor housing (3) and fastened to the first end (5) of the shaft (2),
a bearing arrangement (6, 7, 8) arranged in a bearing housing (9) for mounting the shaft (2), and
an electric motor (10) for driving the shaft (2), said electric motor arranged in the bearing housing (9),
wherein the shaft (2) is comprised of at least
a first shaft bearing part (11),
a second shaft bearing part (12), and
a shaft magnet part (13), arranged between the first and second shaft bearing parts (11, 12), and forms a rotor of the electric motor (10), the shaft bearing parts (11, 12) and the shaft magnet part (13) being braced against one another,
wherein the shaft bearing parts (11, 12) and the shaft magnet part (13) are centered co-axially relative to one another by way of a circumferential centering arrangement (12A, 13F), each of the shaft bearing parts (11, 12) bearing axially against the shaft magnet part (13),
wherein a turbine wheel (21) having a bore is arranged on the second end (20) of the shaft (2),
wherein the turbine wheel (21), the shaft bearing parts (11, 12) and the shaft magnet part (13) are braced against one another by way of a tie rod (19),
wherein a first nut (19C) is provided for the securing the turbine wheel (21) on the second end (20) of the shaft (2) as well as bracing of the shaft bearing parts (11, 12) and the shaft magnet part (13) against one another, and
wherein the compressor wheel (4) is connected to the shaft (2) by a screw connection (23) that is separate from the tie rod (19), said screw connection (23) comprising a threaded pin (23A) having an inner end and an outer end, said threaded pin (23A) extending through the compressor wheel (4), said inner end screwed into an internal thread of the shaft bearing portion (12) of the shaft (2), and a second nut (23B), said second nut (23B) screwed onto said outer end, said second nut (23B) fastening the compressor wheel (4) to the shaft (2).

15. The air feed device as claimed in claim 14, wherein one of the compressor wheel (4) and the turbine wheel (21) is connected to the shaft (2) by way of a screw connection (23), and the other of the compressor wheel (4) and the turbine wheel (21) is connected to the shaft (2) via a tie rod (19) separate from the screw connection (23).

16. The air feed device as claimed in claim 14, wherein the turbine wheel (21) is arranged in a turbine housing which is provided with a variable turbine geometry (22).

* * * * *